US012680310B2

(12) United States Patent

Schneider et al.

(10) Patent No.: US 12,680,310 B2

(45) Date of Patent: Jul. 14, 2026

(54) METHODS OF ASSEMBLING A CABLE RAIL ASSEMBLY

(71) Applicant: BARRETTE OUTDOOR LIVING, INC., Middleburg Heights, OH (US)

(72) Inventors: Christopher Michael Schneider, Linwood, NJ (US); Christopher Heritage, Swedesboro, NJ (US); Patrick Bertke, Mays Landing, NJ (US); Ryan Burgess, Safety Harbor, FL (US)

(73) Assignee: BARRETTE OUTDOOR LIVING, INC., Middleburg Heights, OH (US)

( * ) Notice: Subject to any disclaimer, the term of this patent is extended or adjusted under 35 U.S.C. 154(b) by 185 days.

(21) Appl. No.: 18/202,608

(22) Filed: May 26, 2023

(65) Prior Publication Data

US 2024/0110380 A1 Apr. 4, 2024

Related U.S. Application Data

(60) Provisional application No. 63/412,229, filed on Sep. 30, 2022.

(51) Int. Cl.
*E04F 11/18* (2006.01)
*F16G 11/12* (2006.01)

(52) U.S. Cl.
CPC .......... *E04F 11/1859* (2013.01); *F16G 11/12* (2013.01)

(58) Field of Classification Search
CPC .......... E04F 2011/1882; E04F 11/1817; E04F 11/1859
See application file for complete search history.

(56) References Cited

U.S. PATENT DOCUMENTS 4,730,809 A * 3/1988 Stoler .................... E04H 17/127
200/61.93
6,135,424 A * 10/2000 Bracke ................ E04H 17/1417
256/65.01

(Continued)

FOREIGN PATENT DOCUMENTS

AU 2013224745 4/2014
FR 2975419 11/2012

(Continued)

OTHER PUBLICATIONS

Notification of Transmittal of International Search Report and the Written Opinion; Application Serial No. PCT/US2023/033992; Feb. 19, 2024; 12 pages.

(Continued)

*Primary Examiner* — Daniel J Wiley

(74) *Attorney, Agent, or Firm* — Gardner IP Law, PC

(57) ABSTRACT

A cable railing assembly having a plurality of posts, an expandable cable guide assembly, and a tensioning apparatus, and a method of assembling the cable railing assembly. The expandable cable guide assembly includes a pair of cable braces with a cable extending in a serpentine fashion between the cable braces. The tensioning apparatus includes a tensioner base, a tensioner body, a compression spring positioned between the tensioner base and the tensioner body, a movable carriage slidably mounted adjacent the (Continued)

tensioner body and comprising a cable clamp for gripping the cable, and a threaded adjuster secured to the body and operative for moving the movable carriage along the body.

19 Claims, 13 Drawing Sheets

(56) References Cited

U.S. PATENT DOCUMENTS

| | | | | |
|---|---|---|---|---|
| 9,249,577 B2 * | 2/2016 | Ross | | F16G 11/04 |
| 9,932,754 B2 * | 4/2018 | Schlatter | | E04H 17/127 |
| 9,976,320 B2 * | 5/2018 | Burt | | E04F 11/1859 |
| 11,629,502 B1 * | 4/2023 | Smitchko | | E04F 11/1859 |
| | | | | 256/47 |
| 12,054,952 B2 * | 8/2024 | Melling | | E04F 11/1817 |
| 2006/0151760 A1 * | 7/2006 | Vyvyan-Vivian | | B25B 25/00 |
| | | | | 254/231 |
| 2013/0214226 A1 * | 8/2013 | Gamez | | F16G 11/106 |
| | | | | 256/13.1 |
| 2014/0138596 A1 * | 5/2014 | Ross | | F16G 11/04 |
| | | | | 256/47 |
| 2015/0292234 A1 * | 10/2015 | Burt | | E04H 17/163 |
| | | | | 256/52 |
| 2016/0326768 A1 * | 11/2016 | Schlatter | | E04F 11/1859 |
| 2018/0023316 A1 * | 1/2018 | Leary | | E04H 17/12 |
| | | | | 256/47 |
| 2018/0187449 A1 * | 7/2018 | Schlatter | | E04H 17/127 |
| 2021/0222463 A1 * | 7/2021 | Kane | | E05B 15/0205 |
| 2021/0372131 A1 * | 12/2021 | Li | | E04F 11/1817 |
| 2022/0098870 A1 * | 3/2022 | Melling | | E04F 11/1817 |
| 2022/0228644 A1 | 7/2022 | Graber | | |
| 2024/0368895 A1 * | 11/2024 | Storrer | | E04F 11/1859 |

FOREIGN PATENT DOCUMENTS

| | | |
|---|---|---|
| JP | 2018071145 | 5/2018 |
| KR | 2020090009249 | 9/2009 |
| KR | 101138790 | 4/2012 |
| KR | 20220118159 | 8/2022 |
| WO | 2024072972 | 4/2024 |
| WO | 2024072974 | 4/2024 |
| WO | 2024072978 | 4/2024 |
| WO | 2024072983 | 4/2024 |
| WO | 2024072986 | 4/2024 |

OTHER PUBLICATIONS

Notification of Transmittal of International Search Report and the Written Opinion; Application Serial No. PCT/US2023/033994; Feb. 26, 2024; 13 pages.

Notification of Transmittal of International Search Report and the Written Opinion; Application Serial No. PCT/US2023/033999; Jan. 22, 2024; 11 pages.

Notification of Transmittal of International Search Report and the Written Opinion; Application Serial No. PCT/US2023/034007; Feb. 7, 2024; 11 pages.

Notification of Transmittal of International Search Report and the Written Opinion; Application Serial No. PCT/US2023/034011; Jan. 19, 2024; 11 pages.

European Search Report; Application Serial No. EP232010/84; Mar. 27, 2024; 7 pages.

* cited by examiner

Figure 17
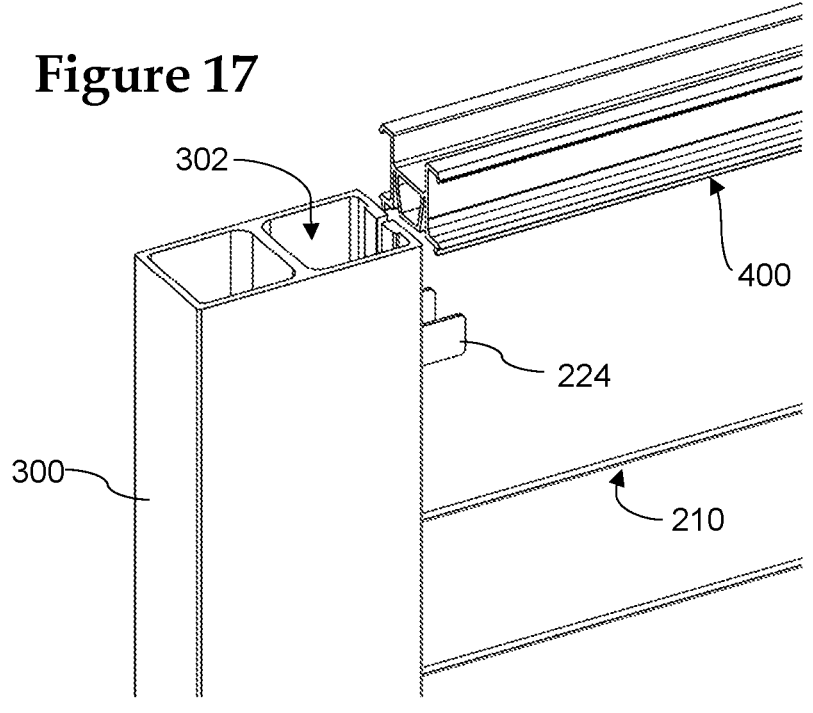
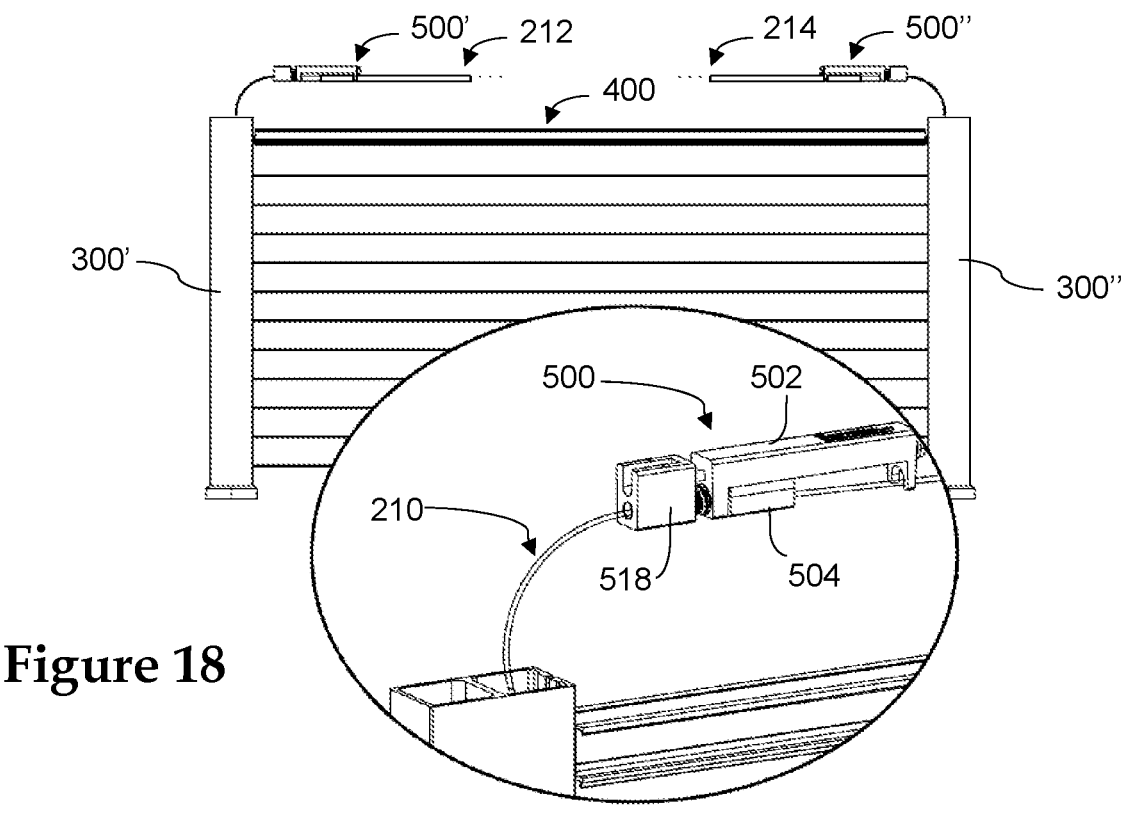
Figure 18

METHODS OF ASSEMBLING A CABLE RAIL ASSEMBLY

TECHNICAL FIELD

The present invention relates generally to a railing systems and, in particular, to a cable railing system with a rail cable tensioner and a method of assembling thereof.

BACKGROUND

A railing system, or railing, is a type of barrier or fencing which generally includes one or more infills secured to a plurality of posts and/or rails. The infills of cable railing systems, for example, are cables or wires secured between the posts and/or rails. In conventional cable railing systems, the cables are either secured or oriented vertically between two or more rails or horizontally between two or more posts. However, each cable is installed and tensioned by hand one at time which can be extremely tedious and time-consuming. Accordingly, it can be seen that needs exist for improved cable railing systems and methods of assembling thereof. It is to the provision of solutions to these and other problems that the present invention is primarily directed.

SUMMARY

Generally described, the present invention relates to railing systems and more particularly a rail with a cable. In a first example embodiment, a method of assembling a cable railing system is disclosed including the steps of positioning a plurality of posts on a support surface and securing at least one cable guide assembly to two successive posts, the at least one cable guide including a first cable guide, a second cable guide, and a cable looping back and forth between the first and second cable guide.

Preferably, the method of assembling the cable railing system also includes the step of securing a beam between the first and second posts.

Preferably, the method of assembling the cable railing system also includes the step of feeding at least one free end of the cable through a tensioning apparatus. The tensioning apparatus includes a base portion, a body portion, a spring engaged between the base portion and the body portion, a threaded adjuster bolt, and a sliding carriage slidably joined to the body portion and operatively engaged to the threaded adjuster bolt.

Preferably, the sliding carriage includes a one-way jaw or cable clamp limiting movement of the cable to one direction.

Preferably, the method of assembling the cable railing system also includes the step of pulling the at least one free end of the cable through the tensioning apparatus and tensioning the cable.

Preferably, the method of assembling the cable railing system also includes the step of turning the threaded adjuster bolt, wherein the turning of the threaded adjuster bolt moves the sliding carriage in a first direction away from the base portion until tension in the cable overcomes the compression spring and the body portion moves in a second direction towards the base portion until the body portion abuts the base portion.

Preferably, the method of assembling the cable railing system also includes the step of deflecting the cable at some point between the first and second cable guides and stretching the cable by some additional length, the additional length providing enough slack in the cable for the spring to push the body portion away from the base portion to cause a gap therebetween.

Preferably, the steps of turning the threaded adjuster bolt until the gap is closed and deflecting the cable until the gap is present.

Optionally, the method of assembling the cable railing system may also include the step of securing a mid-support baluster to the beam between the first and second posts.

Optionally, the method of assembling the cable railing system may also include placing a beam cover over the beam.

Optionally, the method of assembling the cable railing system may also include the step of placing post caps on each of the posts.

In another example form, the present invention relates to a method of assembling a cable railing system having a single cable. The method of assembling the cable railing system includes the steps of providing a cable guide assembly secured between a first post and a second post and tensioning the cable using at least one tensioner. The cable guide assembly includes a first cable guide insert, a second cable guide insert, and a cable looping back and forth between the first and second cable guide inserts. A first end of the cable extends through and out of the first post and a second end opposite the first end of the cable extends through and out of the second post.

Preferably, the first cable guide insert is inserted into a guide receiving channel of the first post and the second cable guide insert is inserted into a guide receiving channel of the second post. Preferably, the first and second posts include a cable slot providing clearance for the cable as the cable guide assembly is slidably secured to the first and second posts.

Preferably, the tensioner comprises a tensioner base, a compression spring, a tensioner body biased apart from the tensioner base by the compression spring, a carriage slidably engaged to the tensioner body by a threaded adjuster bolt such that turning of the threaded bolt moves the carriage relative to the tensioner body. Optionally, the carriage may include a cable-receiving channel with a one-way cable clamp.

Optionally, tensioning the cable using the at least one tensioner may include feeding at least one of the first or second ends of the cable through a cable-receiving channel of the carriage, pulling the at least one of the first or second ends of the cable hand-taut through the tensioner, and turning the adjuster bolt on the tensioner body which thereby moves the carriage in a first direction away from the tensioner base and introduces further tension in the cable until the tension in the cable overcomes a force of the compression spring and moves the tensioner body in a second direction towards the tensioner base until the tensioner body abuts the tensioner base.

Optionally, tensioning the cable may also include deflecting the cable at some point between the first and second ends. The deflection causes the cable to at least semi-permanently stretch by some amount of first length which allows the compression spring to bias the tensioner body away from the tensioner base by the same amount of first length. Optionally, tensioning the cable may also include retightening the cable, once stretched, by turning the adjuster bolt on the tensioner body which thereby moves the carriage in a first direction away from the tensioner base and introduces further tension in the cable until the tension in the cable overcomes the force of the compression spring and moves the tensioner body in a second direction towards the tensioner base until the tensioner body abuts the tensioner base.

Preferably, the steps of deflecting the cable and retightening the cable is repeated until the compression spring is no longer able to distance the tensioner body from the tensioner base.

In still another example form, the present invention relates to a method of assembling a cable railing system having a pair of posts, an expandable cable, and a pair of cable braces coupled to the expandable cable. The method comprises the steps of positioning the pair of posts on a support surface, securing the pair of posts to the support surface, expanding the expandable cable to extend the cable from one post to the other post, securing the cable braces to the posts, and tensioning the cable.

Preferably, the expandable cable comprises a single serpentine cable looped back and forth through the cable guides/cable attachments.

Optionally, the method of assembling a cable railing system may also include positioning a beam between the first and second posts prior to the step of tensioning the cable. Optionally, a beam cover or cap may also be placed over the beam.

Optionally, the method of assembling a cable railing system may also include placing post caps over top ends of the posts after securing the cable braces to the posts.

Preferably, in the step of tensioning the cable, the cable is tensioned using a tensioner or a tensioning apparatus. The tensioner includes a tensioner body to be positioned near an adjacent one of the posts, a movable carriage movably associated with the tensioner body and comprising a cable clamp for gripping the expandable cable, an actuator operative for moving the movable carriage away from the adjacent post, and a compression spring positioned between the adjacent post and the tensioner body for biasing the tensioner body away from the adjacent post. The actuator can be operated to urge the movable carriage away from the adjacent post causing the tensioner body to be urged toward the adjacent post in opposition to the biasing of the tensioner body away from the adjacent post by the compression spring.

The specific techniques and structures employed to improve over the drawbacks of the prior devices and accomplish the advantages described herein will become apparent from the following detailed description of example embodiments and the appended drawings and claims.

BRIEF DESCRIPTION OF THE DRAWINGS

FIG. 3A shows a cross-sectional profile of an end post. FIG. 3B shows a cross-sectional profile of a line post.

FIGS. 8-24 depict a method of assembling a cable railing assembly and various parts thereof according to an example embodiment of the present invention.

DETAILED DESCRIPTION OF EXAMPLE EMBODIMENTS

The present invention may be understood more readily by reference to the following detailed description of example embodiments taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. In addition, any methods described herein are not intended to be limited to the sequence of steps described but can be carried out in other sequences, unless expressly stated otherwise herein.

Figure 1:
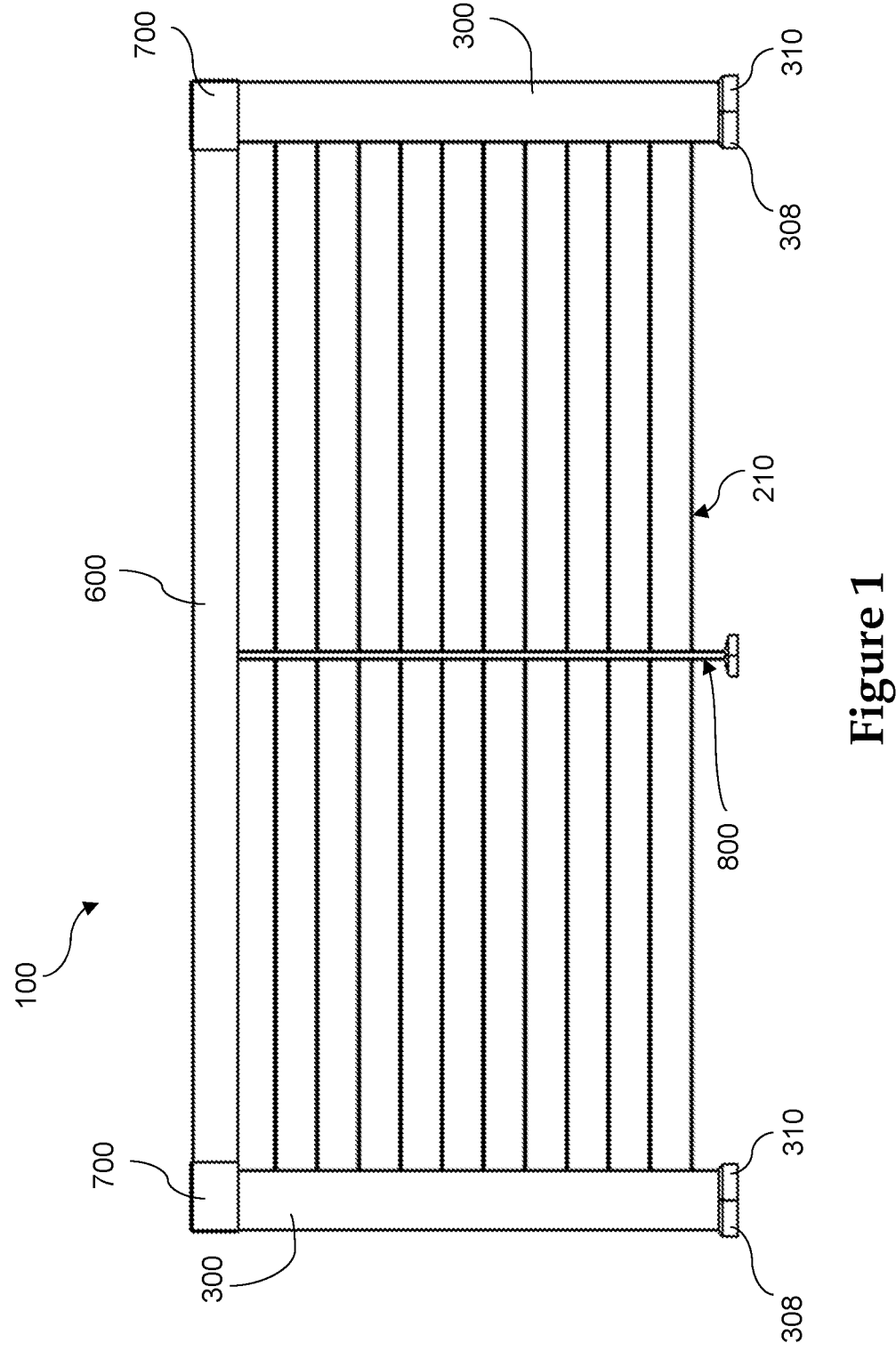
FIG. 1 shows a cable railing assembly according to an example embodiment of the present invention.
Figure 2:
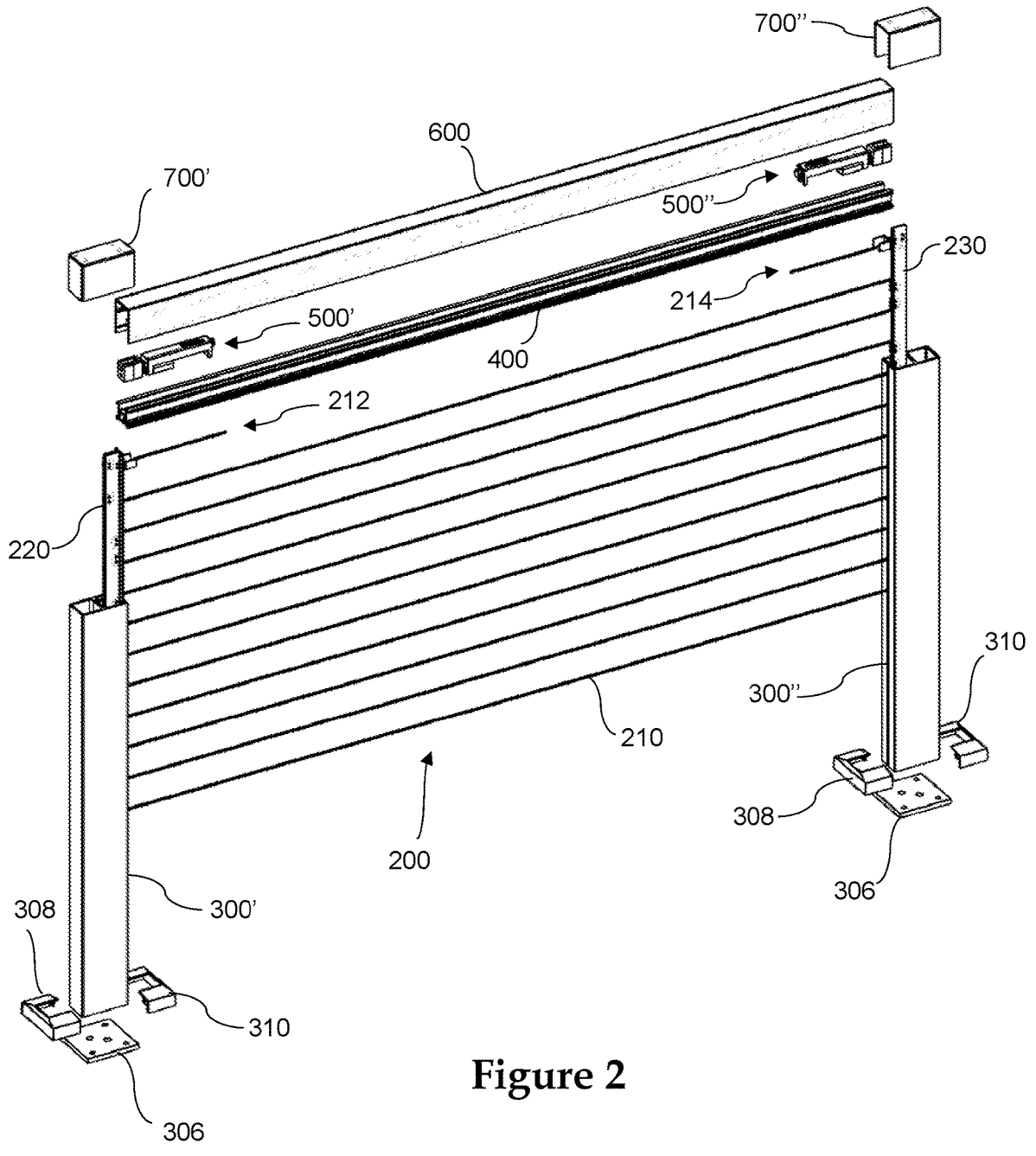
FIG. 2 is a partially exploded view of the cable railing assembly of FIG. 1.

With reference now to the drawing figures, wherein like reference numbers represent corresponding parts throughout the several views, FIG. 1 shows a cable railing assembly or system 100 according to a first example embodiment of the present invention. FIG. 2 shows a partially exploded view of the same cable railing assembly 100. Generally, the cable railing assembly or system 100 includes a cable guide assembly 200, one or more posts or balusters 300, a beam or rail 400, one or more tensioners or tensioning apparatuses 500, a beam cap or rail cover 600, and one or more post caps 700. Optionally, the cable railing assembly may also include one or more mid-support post assemblies 800.

Figure 3C:
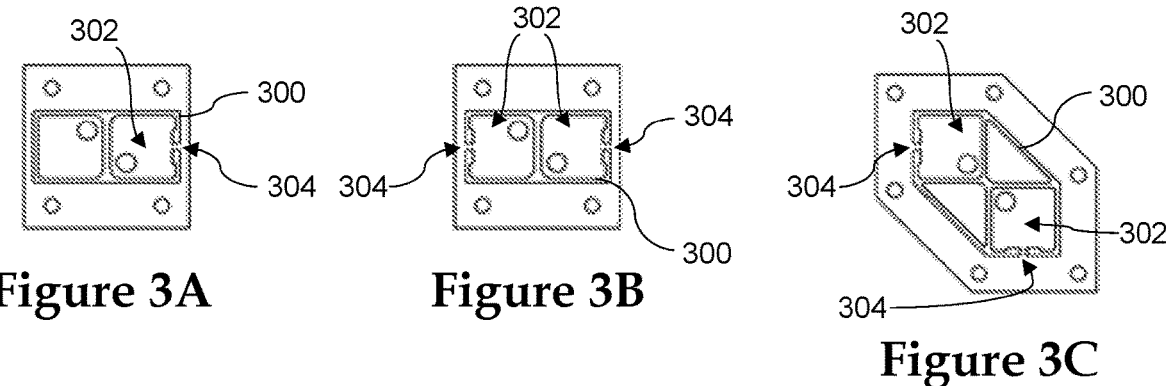
FIG. 3C shows a cross-sectional profile of a corner post.
Figure 4A:
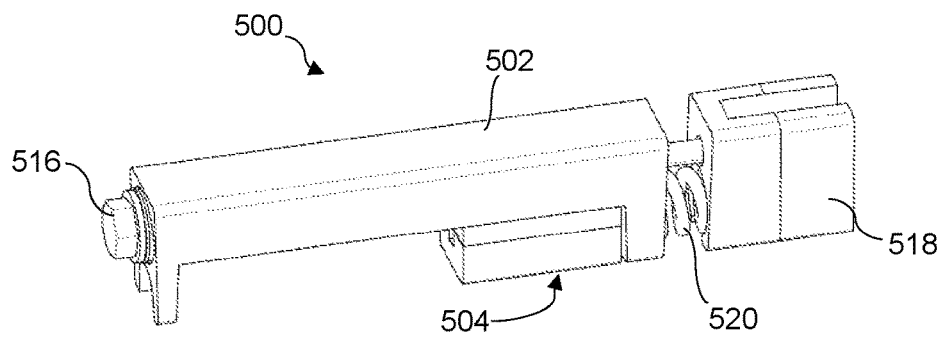
FIG. 4A shows a tensioner according to an example embodiment of the present invention.
Figure 4B:
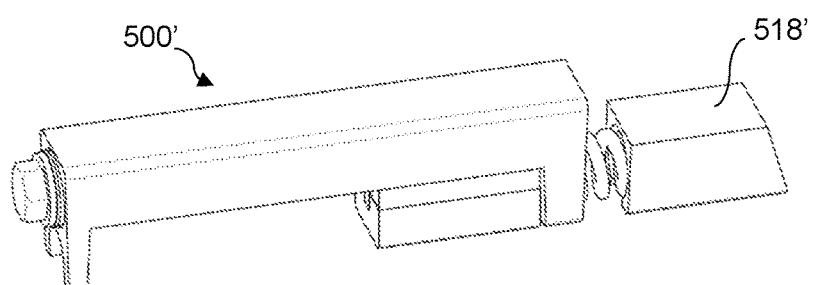
FIG. 4B shows a tensioner according to another example embodiment of the present invention.
Figures 5, 6:
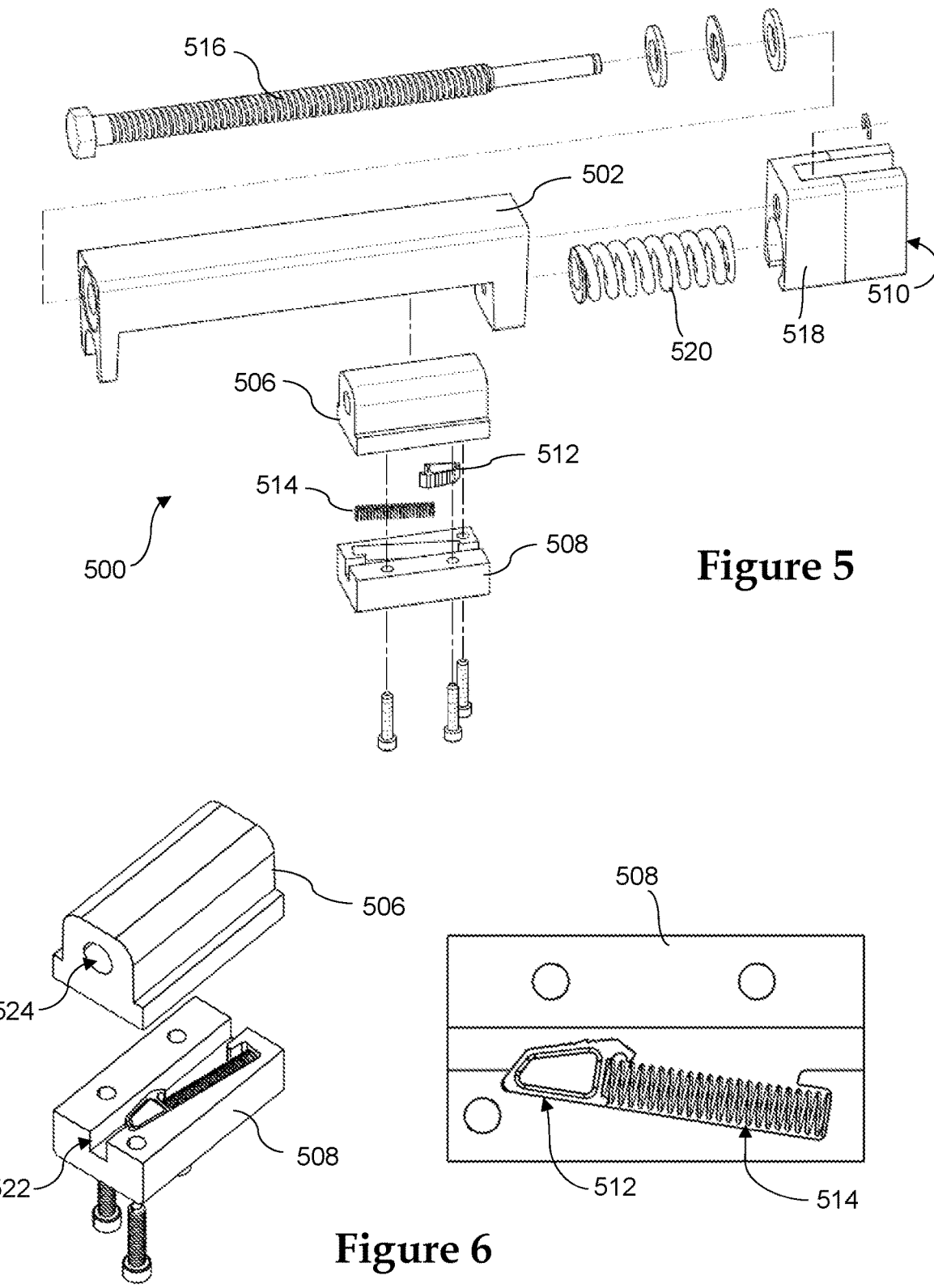
FIG. 5 is an exploded view of the tensioner of FIG. 4A.
FIG. 6 shows a detailed view of a cable clamp housing according to an example embodiment of the present invention.

Generally, posts 300 are rigid, upright columns configured to be positioned and mounted to a ground or support surface, such as, for example, decks, staircases, flooring, and/or backyards. Each post 300 includes one or more channels adapted to receive at least a portion of one or more cable guide assemblies 200. FIGS. 3A-3C show example cross-sectional profiles of different types of posts 300. For example, FIG. 3A shows an example profile of an end post, FIG. 3B shows an example profile of a line post, and FIG. 3C shows an example profile of a corner post. The end post includes one cable guide receiving channel 302 and is generally most suitable for use as the end of a railing system or series of railing systems. The line post includes two cable guide receiving channels 302 and is most suitable for joining two co-linear cable guide assemblies 200. The corner post also includes two cable guide receiving channels 302 and is most suitable for joining two cable guides at an angle, for example at 90 degrees from one another as shown in FIG. 3C. The post 300 also includes a cable slit or slot 304 provided along a side of the post adjacent to each cable guide receiving channel 304. The cable slot 304 provides clearance for cables in the cable guide assemblies 200.

Figures 14, 15, 16:
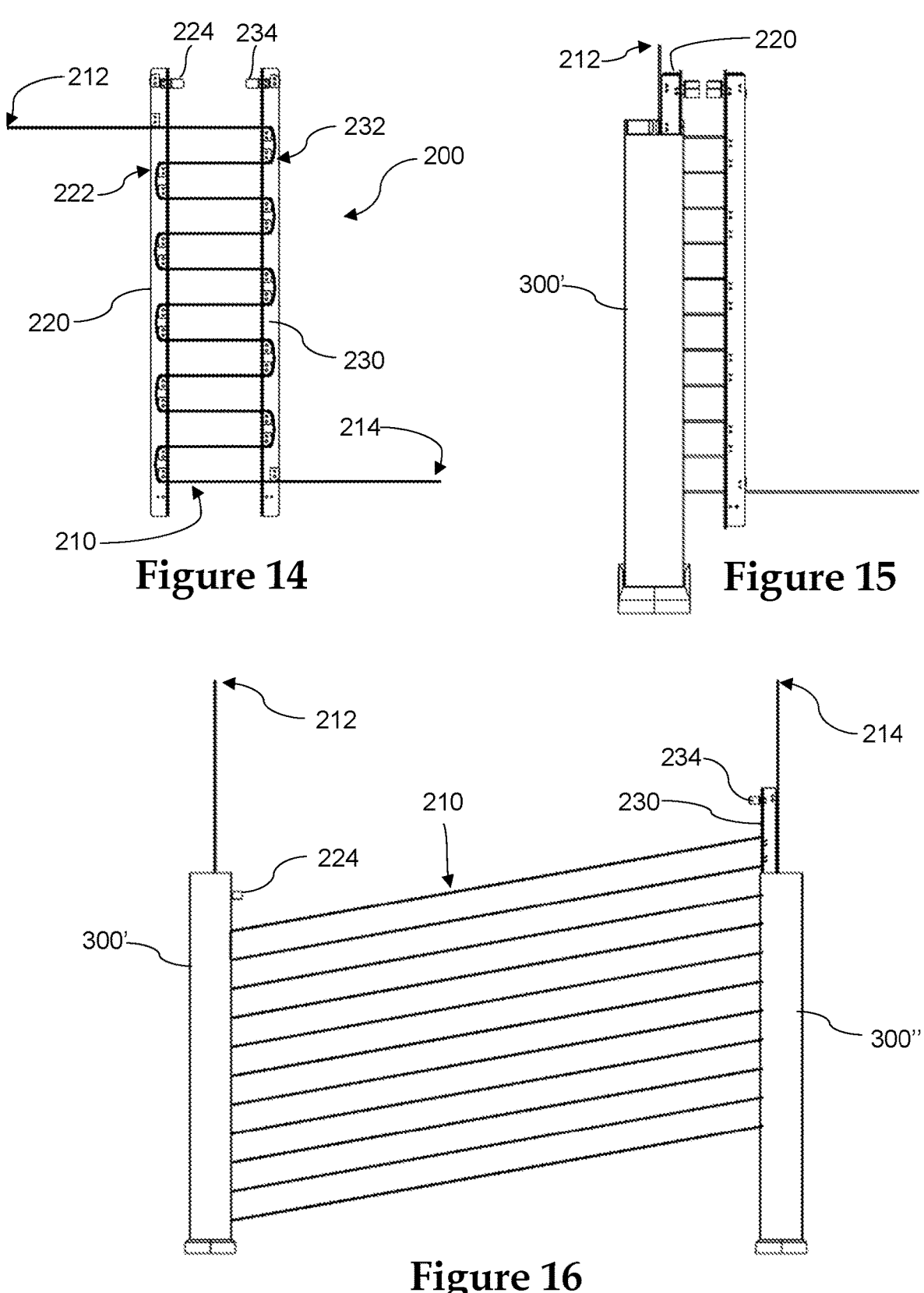

The cable guide assembly 200 generally includes a first cable guide insert or brace 220, a second cable guide insert or brace 230, and a cable or wire 210 engaged between the cable guide inserts. The cable guide inserts generally include a plurality of cable-guiding members or returns 222, 232 in a staggered manner between the first and second cable guide inserts. As shown in FIG. 14, cable 210 is looped between the cable returns 222 and 232 in a serpentine fashion with a first, free end of the cable extending out from a first, top end of the first cable guide insert 220 and a second free end, opposite the first free end, of the cable 210 extending out from a second, bottom end of the second cable guide insert 230. In this manner, a single cable is used to form a plurality of rows of cable between the cable guide inserts. Generally, the cable guide inserts also include beam supporting brackets 224 and 234 capable of receiving and supporting the beam 400 between the upright posts 300. Further details of the cable guide assembly according to example embodiments are provided infra.

The tensioner 500 is a tensioning apparatus used to add tension or tighten the cable 210. Generally, the tensioner 500 includes a tensioner base 518, a tensioner body or carriage housing 502, a compression spring 520 positioned between the tensioner base and the tensioner body for biasing the tensioner body away from the base portion, a movable carriage assembly 504 slidably mounted adjacent the tensioner body and comprising a cable clamp 512 for gripping the cable, and a threaded adjuster secured to the body and operative for moving the movable carriage along the body. The tensioner carriage 504 includes a first carriage portion or threaded slider 506 having a threaded bore 524 therein and a second carriage portion or cable clamp housing 508 having a cable slot or channel 522 with a one-way jaw or cable clamp 512 biased by a compression spring 514 provided therewith. The compression spring 514 is adapted to bias the cable clamp 512 towards the cable channel 522 for allowing the cable to move through the cable channel in one direction but not in the opposite direction. The threaded adjuster bolt 516 is received in the threaded bore 524 of the carriage 504 such that operation of the threaded adjuster bolt causes the carriage to slide laterally along the tensioner body 502. The tensioner 500 is described in greater detail below.

The beam 400 is a rigid support structure adapted to be secured between two spaced-part posts 300 and/or between the two cable guide inserts 220 and 230. Generally, the beam 400 provides lateral support to the posts so as to prevent the posts from deflecting away from the vertical under external load such as for example lateral load placed on the posts from tensioned cables 210 during use. The beam 400 is described in greater detail below. The beam cover or rail 600 may be placed over or seated onto the beam 400 and tensioner(s) 500 to provide coverage. Similarly, trim pieces 308 and 310 and post caps 700 may also be incorporated onto the post for both protective and aesthetic coverage.

Expandable Single Cable Subassembly

As described briefly above, the cable-style railing 100 includes a pair of posts 300, with the posts being configured to be installed upon a support surface or ground. As shown in FIGS. 14-16, the cable guide assembly 200 extends between the posts (for example, first post 300′ and second post 300″) and is threaded therein such that multiple portions of the cable assembly each span between the posts, with the posts initially being in proximity with one another and being adapted to be pulled apart from one another for installation. With this construction, the cable assembly is threaded between the posts and expands as the posts are pulled away from one another, in somewhat or more-or-less accordion style.

In example embodiments, the cable guide assembly 200 includes a single cable threaded between the posts in serpentine fashion. However, the cable assembly can comprise multiple separate cables.

In example embodiments, the posts 300 include a plurality of cable-guiding members or cable returns 222 and 232. The cable returns can take one of several forms, including rollers, pulleys, fixed curved guides, etc. Moreover, and especially in the instance of fixed curved guides, the cable returns can be constructed of a low friction polymer to reduce friction and make it easier to pull the railing assembly apart and expand the cable assembly within the railing assembly.

Tensioner

FIGS. 4A-6 show the cable tensioning apparatus or tensioner 500. In example embodiments, the cable tensioning apparatus 500 includes a tensioner body 502 to be positioned near an adjacent one of the upright posts 300 and a movable carriage 504 slidably mounted adjacent the tensioner body 502 and having a cable clamp 514 for gripping the cable 210. A threaded adjuster bolt 516 is operative for moving the movable carriage 504 away from the adjacent upright post and a base portion 518 has a bore for receiving a portion of the compression spring. The base portion 518 is movably connected to a distal end of the tensioner body 502. A compression spring 520 is positioned between the base portion 518 and the tensioner body 502 for biasing the tensioner body away from the base portion, and wherein the threaded adjuster bolt 516 can be operated to urge the movable carriage 504 away from the base portion 508 causing the tensioner body 502 to be urged toward the base portion 518 in opposition to the biasing of the tensioner body 502 away from the base portion 518 by the compression spring 520.

Preferably, the threaded adjuster bolt 516 comprises trapezoidal-style threads and the movable carriage 504 has a corresponding threaded portion or bore 524 for receiving the threaded adjuster bolt such that as the bolt 516 is turned one way or another the movable carriage 504 is translated in one direction or another relative to the tensioner body 502. In example embodiments, with zero or minimal tension in the cable, the base portion 518 is positioned at a predetermined distance from an end of the tensioner body 502. The base portion 518 has a cable bore 510 for receiving the cable 210 therethrough and the cable can extend through the compression spring 520 and into engagement with the cable clamp 512 in the channel 522 of the movable carriage 504.

As the threaded adjuster bolt 516 is turned one way the movable carriage is translated in one direction along the tensioner body 502 until movement of the movable carriage 504 creates sufficient tension in the cable 210 that the compression spring begins to be compressed between the tensioner body 502 and the base portion 518. When the threaded adjuster bolt 516 is turned enough that the spring 520 is compressed between the tensioner body 502 and the base portion 518 to such an extent that the tensioner body is brought into close contact with the base portion, a predetermined amount of tension force is developed in the cable. In other words, the tensioner body 502, movable carriage

504, and actuator having a threaded adjuster bolt 516 are configured and adapted such that a predetermined tensile force can be developed in the cable 210 simply by turning the threaded adjuster bolt to a predetermined extent, wherein the predetermined extent of turning the threaded adjuster bolt comprises turning the threaded adjuster bolt until the compression spring is compressed a predetermined amount, resulting in a predetermined tension force in the cable.

In example embodiments, the compression spring 520 has a spring rate of between about 150 pounds per inch and about 700 pounds per inch. Preferably, the compression spring has a spring rate of between about 250 pounds per inch and about 600 pounds per inch and, more preferably, about 500 pounds per inch.

Bridge Beam

A rigid beam 400 extends between the spaced-apart posts adjacent upper portions of the spaced-apart posts 300", 300"' such that as the cable 210 is tensioned by the tensioning device, the rigid beam 400 keeps the upper portions of the spaced-apart posts a predetermined distance apart from one another. In other words, despite the force exerted on the posts by the cable, the beam 400 keeps the posts 300', 300" from deflecting toward each other and away from vertical.

Preferably, the rigid beam 400 is made from an aluminum extrusion, such that it has the same profile all along its length. Using an aluminum extrusion provides good strength without excessive weight, while also providing inherent resistance to corrosion. The beam 400 defines a channel 410 therein and the tensioning device 500 is housed within the channel 410 of the rigid beam 400. Also optionally, channel 410 of the rigid beam 400 has a generally U-shaped profile and the tensioning device is housed within the channel 410 of the rigid beam. Further, a cover 600 can be provided for concealing the rigid beam 400 (and the tensioning device 500).

Figure 19:
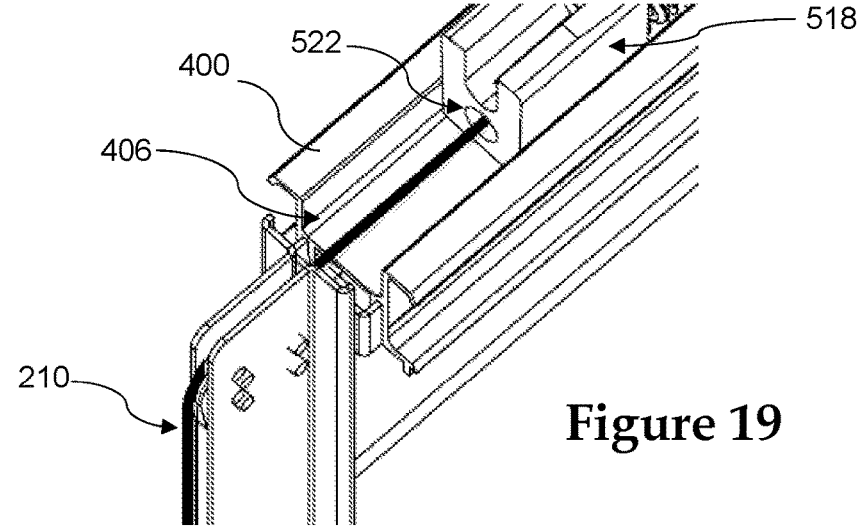
Figure 23:
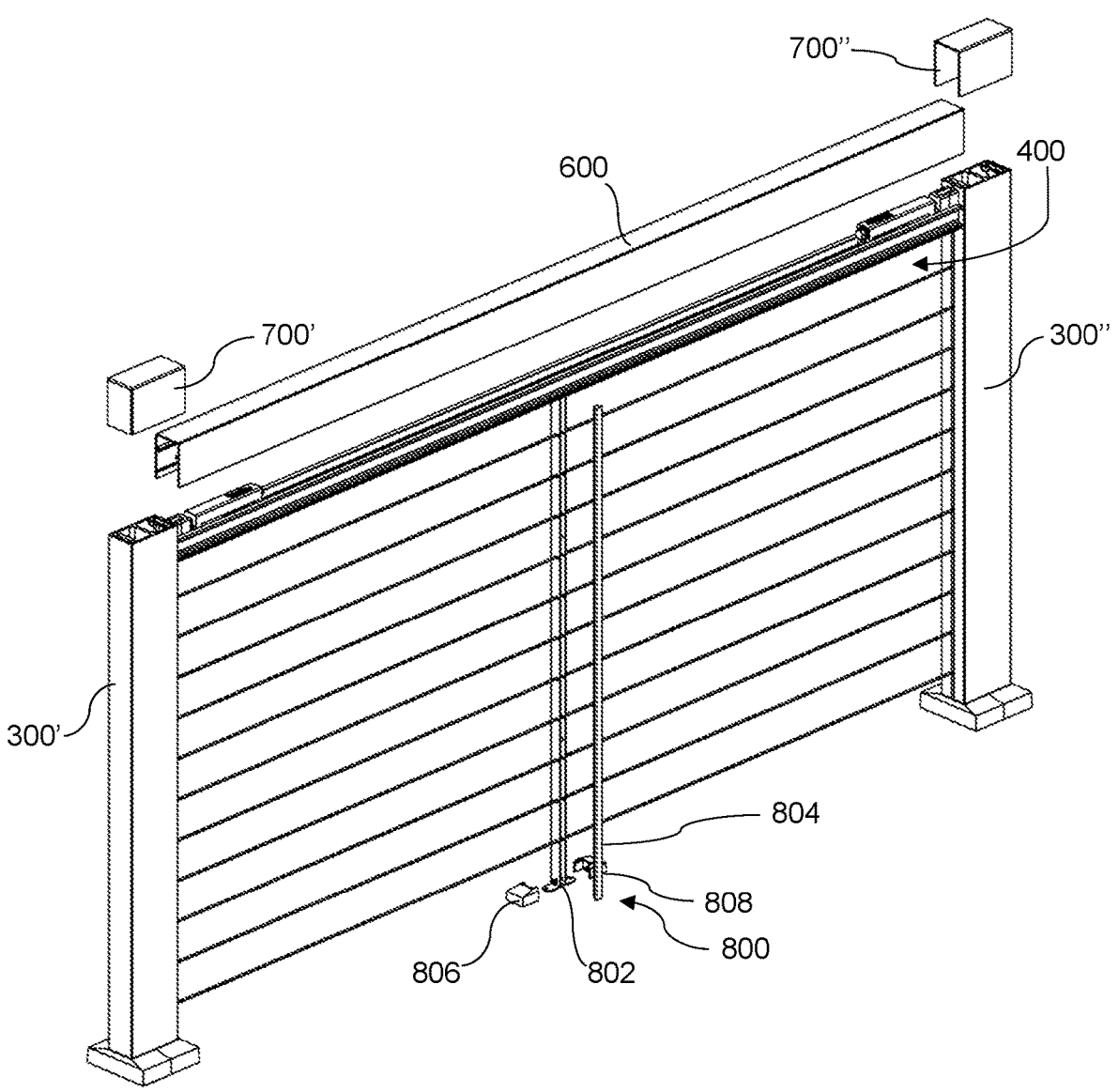

Preferably, the rigid beam 400 or the posts 300 include supports 224, 234 for vertically and loosely supporting the rigid beam 400 at upper portions 350 of the posts until the tensioning device 500 is operated to create tension in the cable 200, effectively clamping the rigid beam 400 between the spaced-apart posts 300 and holding the posts apart. As best seen in FIG. 17, the rigid beam 400 has a roughly X or H profile, defined by upper out flanges 420, 421, side walls 422, 423, and lower outer flanges 424, 425. Horizontal element or floor 426 connects the sidewalls 422, 423. A lower boxed-in channel is formed by the floor 426, lower floor 427, and angled sidewalls connecting the two. These angled sidewalls are spaced a small distance from the sidewalls 422, 423 to create a narrow vertical slot into which vertical portions of the supports 224, 234 can be closely received. This engagement is best seen in FIG. 19, while the geometry of this narrow vertical slot is best seen in FIG. 17. FIG. 23 (partially exploded) shows the beam cap 600 for covering the rigid beam 400 and the tensioning devices 500, as well as showing the post caps 700' and 700" for capping the posts. These caps keep rain and debris out of these elements, as well as concealing the workings of the tensioning devices, thereby minimizing the opportunity for unauthorized tampering with the components.

Cable Railing Assembly Kit

Optionally, the apparatus can be sold as a kit suitable for D-I-Y installation or for installation by professional installers. The cable-style railing kit is for assembly and installation upon a surface. The cable-style railing kit includes a pair of posts 300, with the posts being configured to be installed upon the surface. A cable assembly 200 includes a single cable 210 that extends in serpentine fashion between a pair of cable guide assemblies 220, 230. The cable guide assemblies are adapted to be attached to the posts 300. Further, the cable assembly 210 is threaded and configured such that the cable guide assemblies can be pulled or moved apart from one another while the cable remains threaded in the cable guide assemblies 220, 230 and while the cable expands its span. At least one tensioner 500 is provided for tensioning the cable once the cable guides are attached to the posts.

With this arrangement, the user/installer can install the posts 300, expand the cable assembly 200 and attach the cable guides 220, 230 to the posts 300, such that multiple portions of the cable assembly 200 each span between the posts. Once the cable is spanning the posts, the cable can be tensioned with the tensioning device(s) 500.

In the kit, the cable guides can be pre-attached to the posts and the posts are initially in close proximity with one another. The user/installer then pulls the posts apart from one another for installation. With this construction, the cable assembly is threaded between the posts and expands as the posts are pulled away from one another, in somewhat or more-or-less accordion style. Again, once the posts are installed upon the surface with the cable extending back and forth between the posts in serpentine fashion, the user/installer can tension the cable with the tensioning device. Optionally, there can be two tensioning devices, one for each end of the cable.

Optionally, a rigid beam 400 can be provided to be placed between the posts and in initial contact with upper portions of the posts such that as the cable assembly is tensioned by the tensioning device, the rigid beam 400 keeps the upper portions of the posts a predetermined distance apart from one another—it keeps them vertical and avoids or minimizes deflection of the posts despite the substantial forces on the posts from the tension in the cable 200.

Method of Assembly

Figure 7:
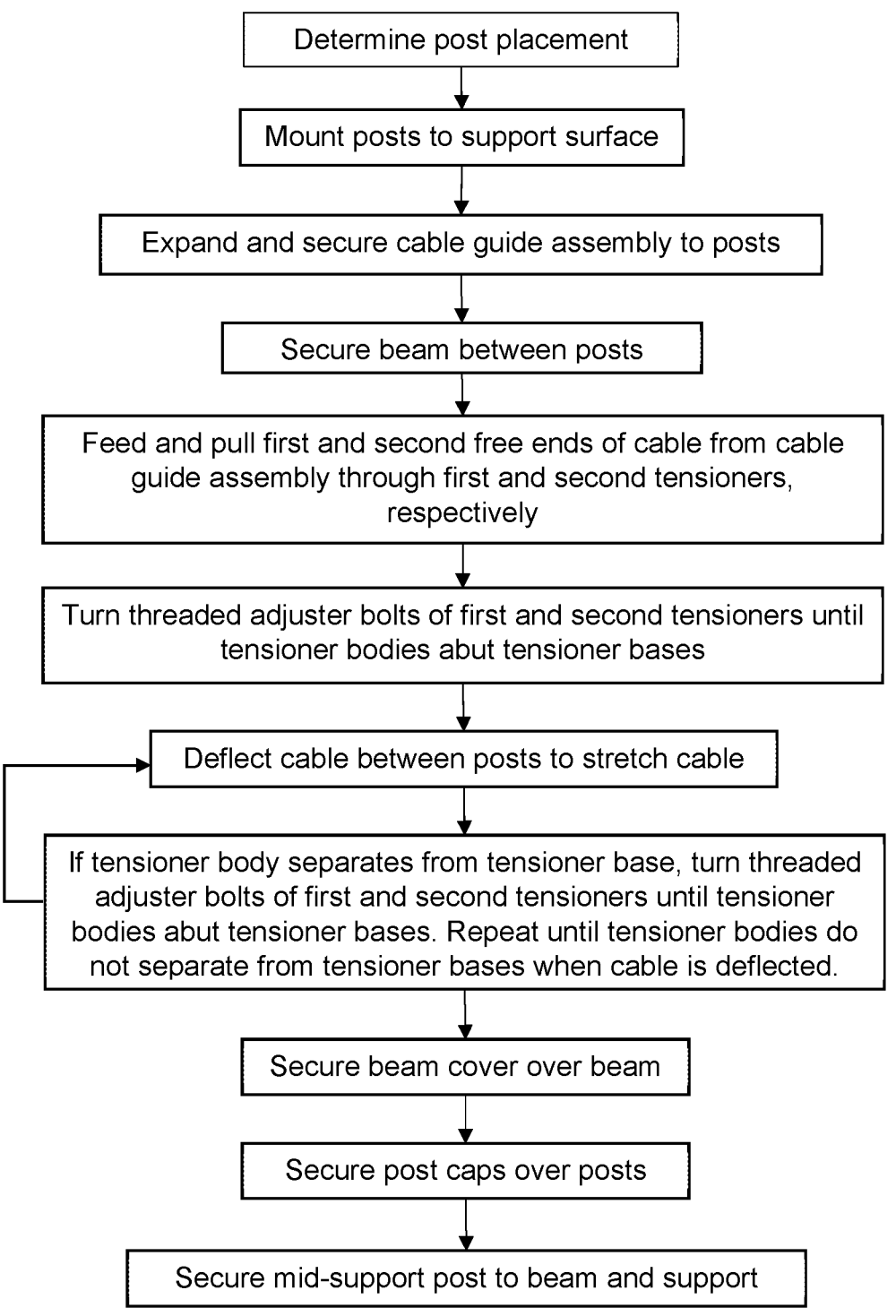
FIG. 7 is a flow chart showing the steps of assembling a cable railing assembly according to an example embodiment of the present invention.
Figure 8:
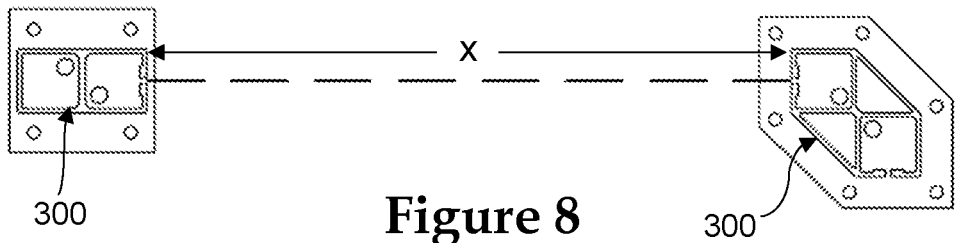
Figure 9:
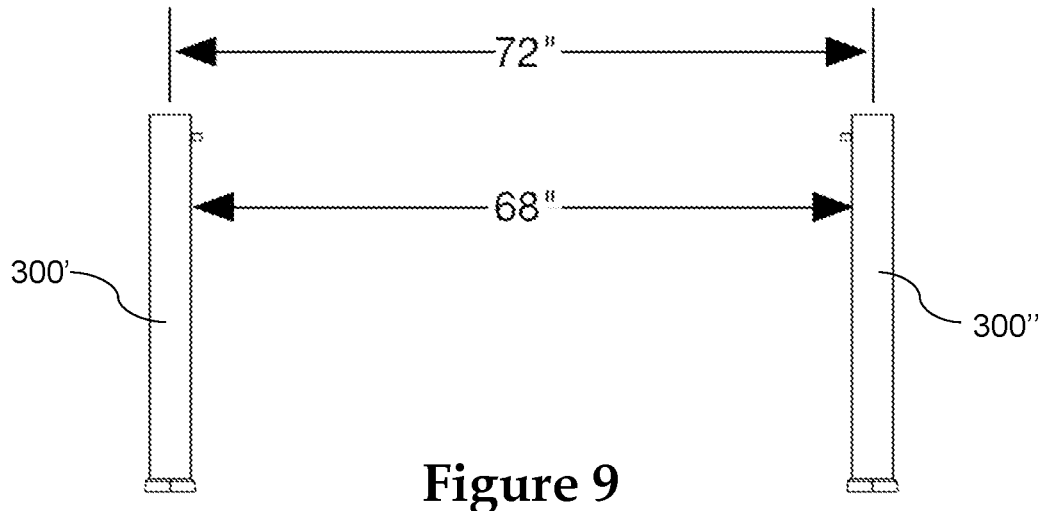

FIG. 7 generally shows a flow-chart generally including the steps of assembling and installing the cable rail assembly 100 according to an example method of use. For example, the user first determines the desired placement of the posts. Preferably, the posts are aligned from the center, as shown in FIG. 8. Preferably, a chalk line is used to mark the mounting surface to ensure that all posts are properly aligned. Preferably, the maximum span of a single section of pre-assembled railing is about 68 inches between posts (or about 72 inches on center) as shown in FIG. 9. However, the span of a single section of pre-assembled railing may be about more or less than 68 inches between posts (or about 72 inches on center). For example, the span of a single section of pre-assembled railing may be customized as needed or desired. Moreover, a plurality of cable railing assemblies may be joined together for example with the use of a combination of end, line, and corner posts to join a plurality of cable guide assemblies to form an extended fencing or railing.

Figure 10:
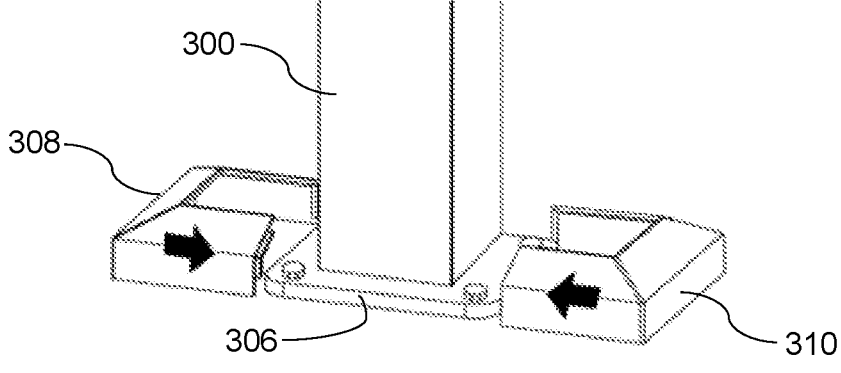
Figures 11, 12, 13:
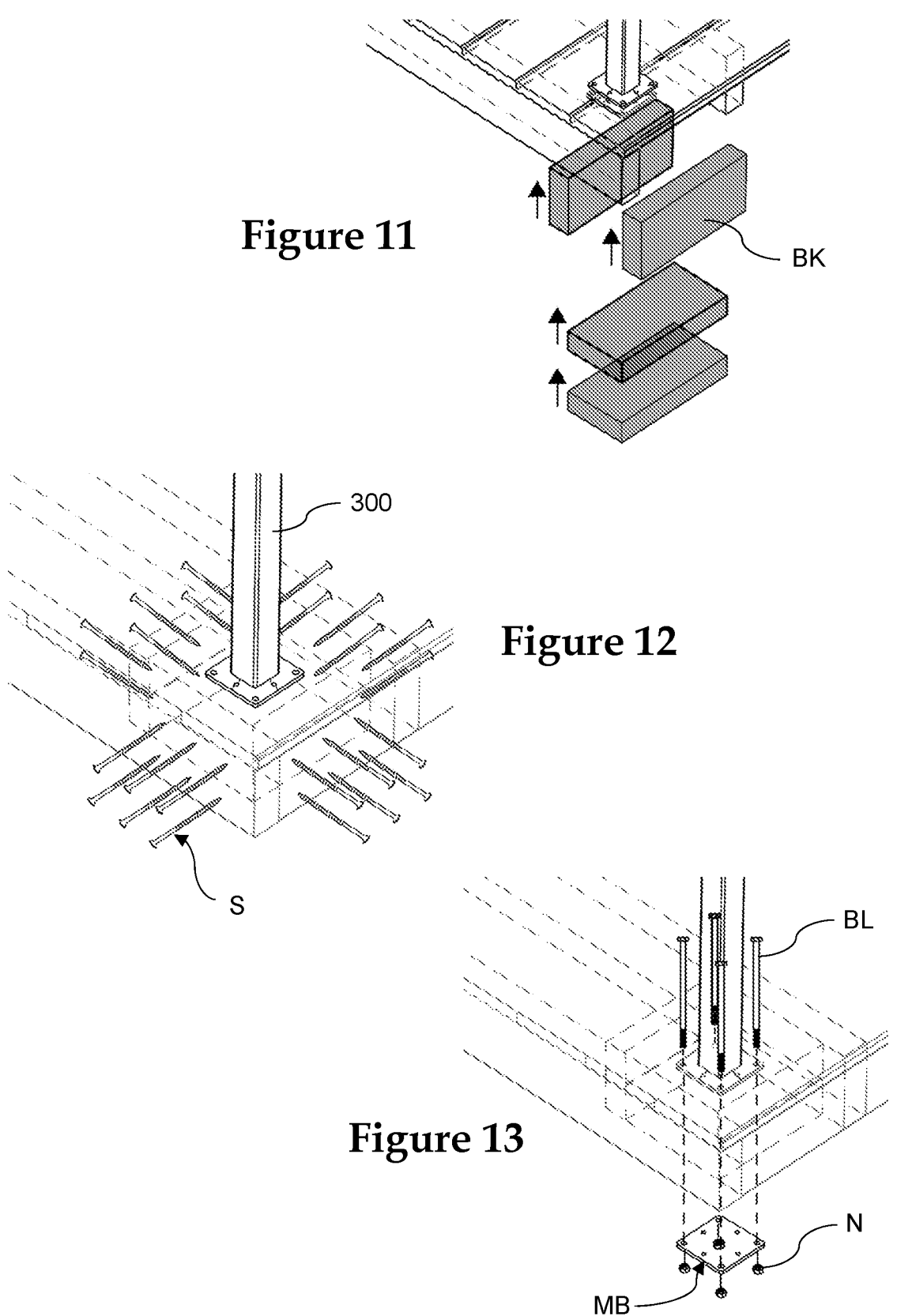

Once the post placements are determined, the posts are secured in place with appropriate fasteners and base trims are installed on each post as shown in FIG. 10 (i.e., first base trim section 308 and second base trim section 310 are joined together at the base of each post). However, the method of securing the posts may vary depending on the material and/or properties of the surface on which the railing assembly is installed. For example, for concrete surface installations, the use of masonry anchors (such as for example ⅜ inch masonry anchors) may be preferred. For decking or wood installations, a secondary mounting plate may be used to secure the posts in place. For example, as shown in FIGS. 11-13, at least two 2"×8" blocks BK (e.g., wood blocks) are preferably installed beneath each post using appropriate fasteners S (e.g., #10-3.5" deck screws) preferably penetrating through the joists at least 1.5 inches into the blocks. The deck surface is then marked through the holes provided on the bottom plates of the steel posts onto the deck surface. Using the marks as guides, holes (preferably about ⁷⁄₁₆") are drilled through the deck board and blocking. Bolts BL, such as for example ⅜" diameter hot dipped galvanized or stainless-steel bolts, are then pushed through the post plate, deck board, and blocking. A separate bottom plate MB is secured to the bolts BL from beneath the deck surface with appropriate nuts N, as shown in FIG. 16. The posts may be further leveled as needed using leveling shims.

With the posts installed, the level cable guide assemblies can be assembled to the posts. As shown in FIG. 14, and described above, each level cable guide assembly includes a first cable guide or brace 220 and a second cable guide or brace 230 connected by a cable 210 looping back and forth between the first and second cable guides. In example embodiments, the first end 212 of the cable extends out of a top end of the first cable guide 220 and the second, opposite end 214 of the cable extends out of a bottom end of the second cable guide 230. The first cable guide may be installed in or secured to a first post 300' by sliding the first cable guide 220 into the first post so that the bottom end of the first cable guide bottoms out on the first post base plate 306, as shown in FIG. 15. Preferably, the first, free end 212 of the cable is left extending out of the top end of the first post 300'. In exampled embodiments, the posts 300 include at least one open slit or slot 304 along at least one of the sides to allow the cable to slide therethrough, as shown in FIGS. 3A-3C.

As shown in FIG. 16, with the first cable guide 220 properly placed within the first post 300', the second cable guide 230 is moved towards a second post 300" and installed therein by sliding the second cable guide 230 into a guide receiving channel 302 of the second post. In exampled embodiments, the second cable guide 230 is installed so that the lower end of the second cable guide bottoms out on the second post base with the second, free end 214 of the cable extending out of the top end of the second post 300". A back-and-forth motion may help in stretching and loosening the cable 210 between the first and second cable guides as the second cable guide is moved towards the second post. Preferably, the cable guide assembly 200 is installed in the first and second posts 300', 300" with equal amounts of excess cable extending from each post. The cable may be redistributed between the first and second cable guides by loosening therebetween and pulling the first and second free ends 212, 214 so as to introduce tension in the cable 210.

Figure 24:
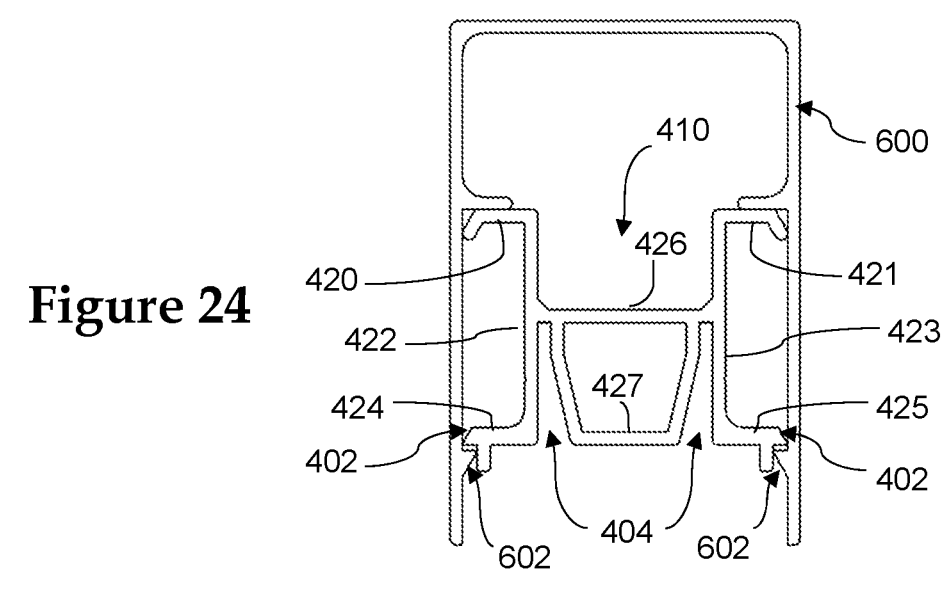

Once the cable guide assembly is properly secured between two posts (i.e., the first and second posts 300', 300"), the beam 400 is measured and cut to a length approximate to the distance between the posts. Preferably, the beam is cut to a length that is about 0.5 inches less than the distance between the posts. As best shown in FIG. 24, the beam 400 comprises a cross-sectional profile having one or more slots 404 for receiving and securing to beam brackets 224 and 234. In the depicted embodiments, the beam comprises two vertical slots 404 configured to fit over two vertical tabs or flanges of the beam brackets, as shown in FIG. 16. The beam further comprises a longitudinal channel 410 configured to receive and seat cable tensioners 500.

Figure 20:
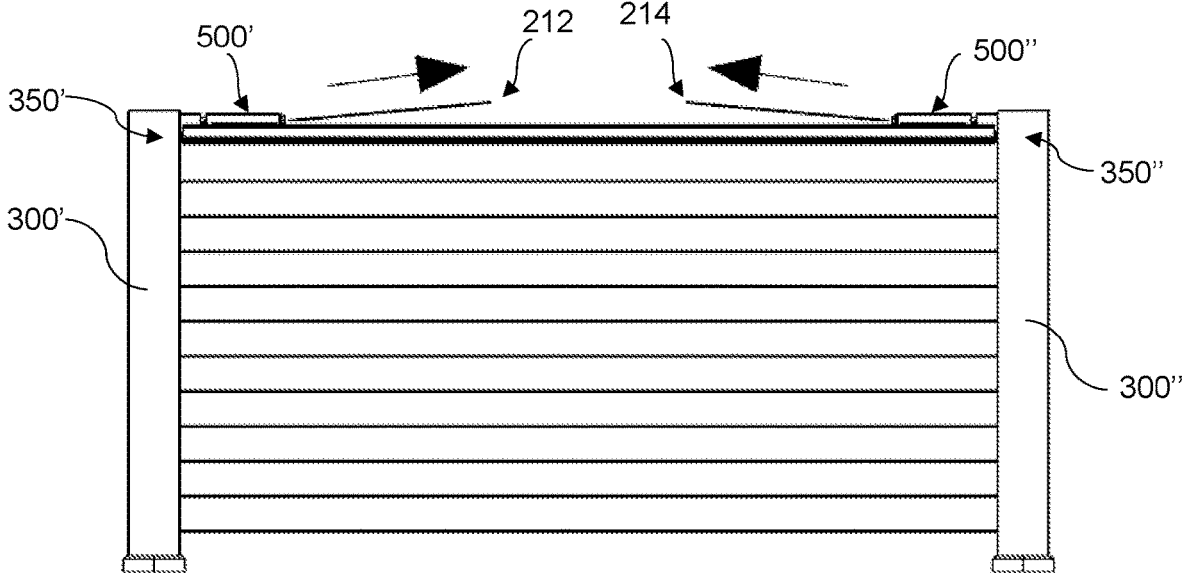

With the beam secured in place between the beam brackets 224 and 234, each free end of the cable is fed through a cable tensioner 500, as shown in FIGS. 17-19. Each cable tensioner is placed or seated into the channel 410 of the top beam 400 as close to each adjacent post as possible (see FIGS. 20 and 21). In example embodiments, the first free end 212 of the cable is fed through cable tensioner 500' and the second free end 214 is fed through cable tensioner 500". The cable 210 is pre-tensioned by pulling as much slack through the cable tensioners by hand (i.e., by pulling both the first and second ends 212, 214 of the cable towards the middle of the assembly or in opposite directions so as to introduce tension in the cable as depicted by the arrows in FIG. 20). In other example embodiments, a knot or a stopper may be added to one end of the cable wherein the knot or stopper acts as an anchor and secures said end to a portion of the post or cable guide insert. For example, a tensioner may be provided at the first end of the cable while a knot or a stopper is added to the opposite, second end. In this way, tension may be introduced in the cable by pulling the first, free end of the cable through the one tensioner until the knot or stopper on the second end of the cable abuts for example the cable guide insert or a portion of the post whereby the second end of the cable is anchored and prevented from moving further.

Figures 21, 22A, 22B:
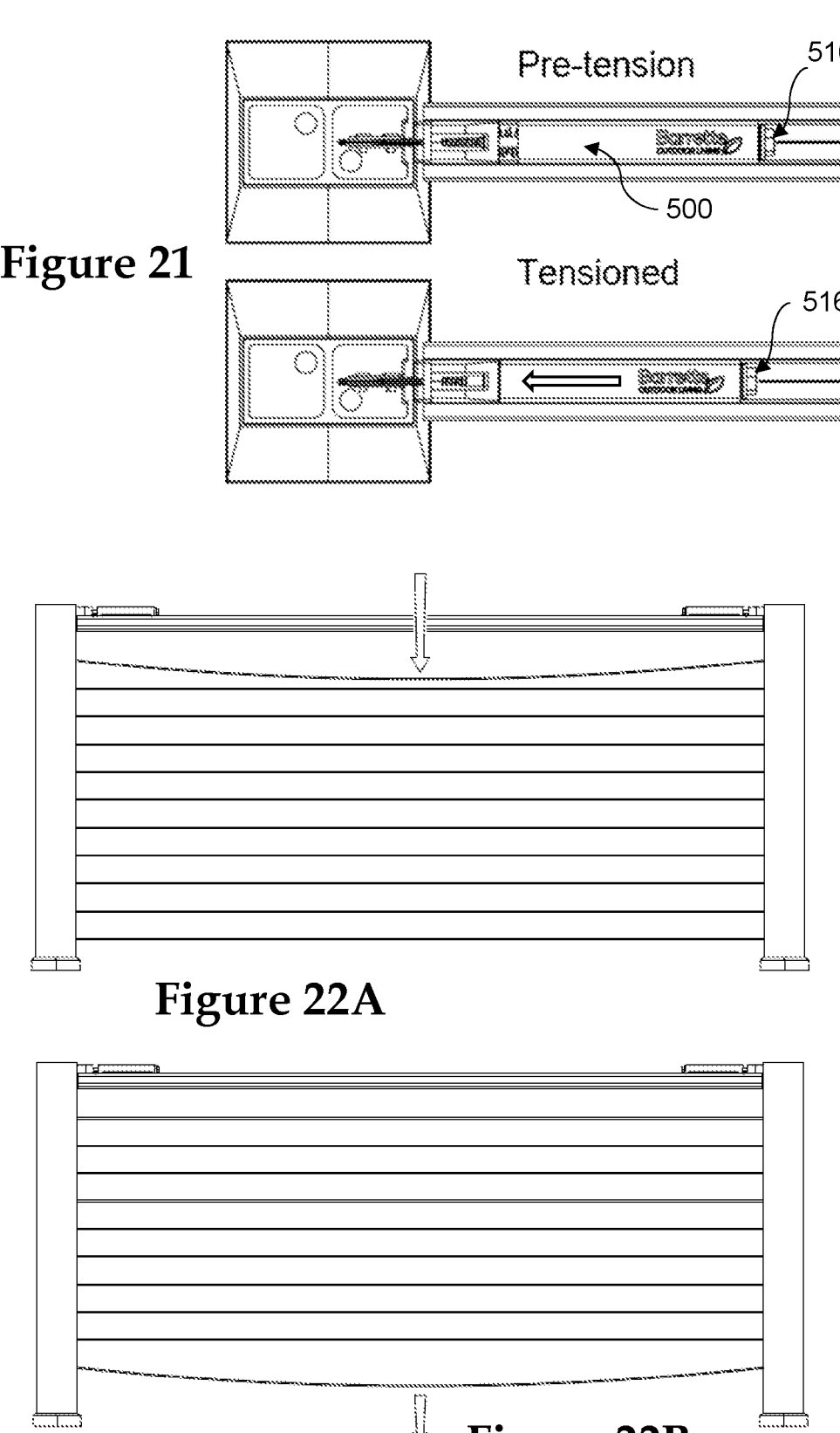

In example embodiments, tensioners 500 are used to further tighten or introduce further tension in the cable. With the movable carriage assembly 504 positioned as close to the tensioner base portion 518 and a gap visible between the tensioner base portion 518 and the tensioner body portion 502 (i.e., pre-tensioned state or configuration, as shown in FIG. 21), cable 210 is threaded through cable channels 522 and 510 of the tensioner base portion 518 and carriage 504, respectively. The cable 210 is thereby also threaded through the compression spring 520. The carriage bottom 508 comprises a one-way jaw or cable clamp 512 biased by a clamp spring 514 which prevents the cable from retracting back in the opposite direction once threaded or pulled through the cable channels. The compression spring 520 is sufficiently stiff such that appreciable compression of the spring is difficult to achieve, or unlikely, if the cable is pulled or tensioned by hand. In example embodiments, the compression spring is configured to assert a specific, pre-determined tension in the cable. In this way, a specific, pre-designed amount of tension in the cable can be asserted through tensioner which allows an installer or a maintenance person to set the tension to a specific, pre-defined tensile force in an easily repeatable manner without any measuring instrument or specialized tool or knowledge. In other example embodiments, the compression spring may in interchanged with others having different spring rates as desired or needed.

With the cable ends 212 and 214 pulled hand-taut through the cable tensioners 500' and 500", respectively, additional tension can be introduced in the cable using the tensioners. In example embodiments, a threaded adjuster bolt 516 is threaded through the threaded bore 524 of the threaded slider 506 such that carriage 504 moves back and forth laterally along and relative to the tensioner body 502 when the adjuster bolt 516 is turned one way or the other. In example embodiments, as the threaded bolt is turned for example clockwise, the sliding carriage 504 moves away from the tensioner base portion 518 which thereby pulls the cable further away from the base portion and introduces additional tension in the cable 210. When the tension in the cable is sufficiently high, the tension or tensile force of the cable 210 overcomes the opposing force of the compression spring 520 and urges the tensioner body 502 to move towards the tensioner base portion 518 compressing the spring 520 in the process. According to example embodiments, the threaded bolt 516 is turned until the tensioner body portion 502 comes into contact with the tensioner base portion 518 thereby eliminating any gap therebetween (i.e., tensioned state or configuration), as shown in FIG. 21.

To eliminate or reduce any remaining slack in the cable, additional tension is added by first firmly deflecting the top and bottom rows of the cable (for example, by stepping or pushing down on the cable). For example, deflection of the top and bottom rows of cable 210 (as shown in FIGS. 22A and 22B) causes the cable to stretch or deform and, at least semi-permanently, increase in length. The additional length in the cable allows the compression spring 520 to push the sliding carriage 504 and tensioner body portion 502 away from the tensioner base portion 518 and reintroduces the gap therebetween. The cable can now be tightened again by turning the threaded adjuster bolt 516, as described above. Preferably, the tightening-deflecting steps are repeated until there no further gap is visible even after attempting to deflect the cable further. If the cable 210 becomes loose over time, the cable can be tightened again easily by tightening the adjuster bolt as described herein. If there is no gap between the tensioner base portion 518 and the tensioner body portion 502 after deflecting the cable, the tension in the cable is now set to the specific, pre-determined value (i.e., as set by the compression springs 520 in the tensioners 500). Preferably, excess cable extending beyond the tensioners 500 is removed leaving about 12 in. of cable. The remaining excess cable may be stored in the top channel 410 of the beam 400.

Once the cable is properly tensioned, a mid-support post assembly 800 may be added to provide additional support to the beam 400, as shown in FIG. 23. The mid-support post assembly comprises a mid-support post 802, a mid-support post cover 804, a first mid-support trim piece 806, and a second mid-support trim piece 808. The mid-support post assembly 800 may be installed anywhere the mid-support post assembly is desired or needed. Preferably, the mid-support post assembly is provided approximately in the middle of two adjacent posts to provide the most support. As shown in FIG. 21, the bottom end of the mid-support post is secured to the ground or support surface, and the top end of the mid-support post is secured to an underside of the beam 400. The mid-support post comprises a series of slots aligned to the rows of cables in the cable guide assembly 200, which allows sliding the mid-support post 802 between the beam 400 and the ground or support surface such that the rows of cable fit or slide into the slots of the mid-support post. The mid-support cover 804 is then secured or joined to the mid-support post 802 enclosing the rows of cable in the slots of the mid-support post. In example embodiments, the mid-support cover 804 is secured to the mid-support post with flat head screws but it will be appreciated by those skilled in the art that the cover 804 may be secured to the post 802 using any suitable mechanical and non-mechanical means, such as for example friction fittings, adhesives, welds, or fasteners. Preferably, the first and second trim pieces 806, 808 are joined together at the bottom end of the mid-support post to provide cover and better aesthetics.

Finally, the top, open ends of the posts 300 are covered with post caps 700 (i.e., end cap 700' for post 300' and end cap 700" for post 300") and the rail or beam cover 600 is secured over the beam 400. As shown in FIG. 22, the beam 400 comprises locking lips or ribs 402 on each side of its cross-sectional profile. The beam cover 600 comprises a pair of locking shelves 602 configured to deflect and slide over the locking lips 402. In example embodiments, the bottom or leading edges of the locking shelves 602 and upper edges of the locking lips 402 are chamfered to help deflect the sides of the beam 400 and/or beam cover 600 apart as the beam cover is secured or installed over the beam.

Figure 25:
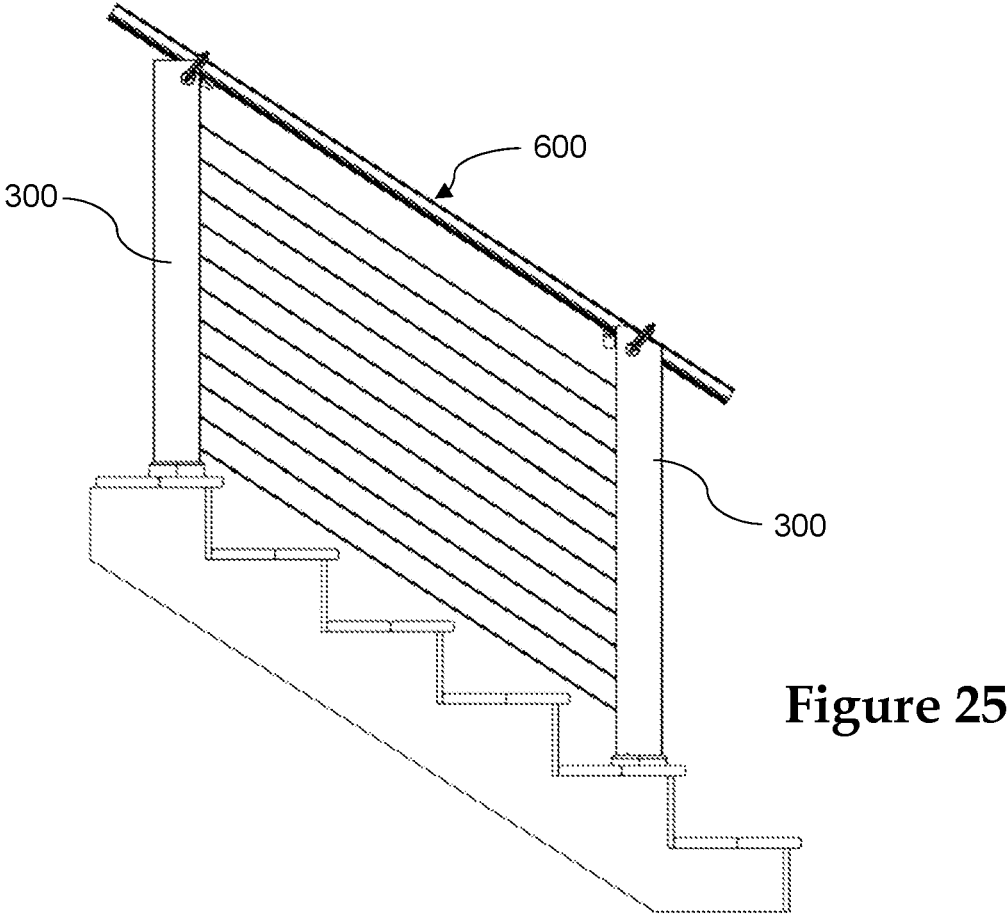
FIG. 25 shows a cable railing assembly according to another example embodiment mounted to a staircase.

In other example embodiments, the cable railing assembly 100 may be installed on a staircase or a sloped support surface as shown in FIG. 25. The method of installing the cable railing assembly 100 on a sloped surface is substantially similar to the method of installing the cable railing assembly 100 on a flat surface described above.

While the claimed invention has been shown and described in example forms, it will be apparent to those skilled in the art that many modifications, additions, and deletions can be made therein without departing from the spirit and scope of the invention as defined by the following claims.

What is claimed is:

1. A method of assembling a cable railing system, the method comprising the steps of:
   positioning a plurality of posts on a support surface;
   securing at least one cable guide assembly to two successive posts, the at least one cable guide comprising a first cable guide, a second cable guide, and a cable looping back and forth between the first and second cable guide;
   securing a beam between the first and second posts; and
   feeding at least one free end of the cable through a tensioning apparatus, wherein the tensioning apparatus comprises a base portion, a body portion, a spring engaged between the base portion and the body portion, a threaded adjuster bolt, and a sliding carriage slidably joined to the body portion and operatively engaged to the threaded adjuster bolt.

2. The method of claim 1, wherein the sliding carriage comprises a one-way cable clamp limiting movement of the cable in one direction.

3. The method of claim 1, further comprising pulling the at least one free end of the cable away from the tensioning apparatus and tensioning the cable.

4. The method of claim 3, further comprising turning the threaded adjuster bolt, wherein the turning of the threaded adjuster bolt moves the sliding carriage in a first direction away from the base portion until tension in the cable overcomes the compression spring and the body portion moves in a second direction towards the base portion until the body portion abuts the base portion.

5. The method of claim 4, further comprising deflecting the cable at some point between the first and second cable guides and stretching the cable by some additional length, the additional length providing enough slack in the cable for the spring to push the body portion away from the base portion to cause a gap therebetween.

6. The method of claim 5, further comprising repeating the steps of turning the threaded adjuster bolt until the gap is closed and deflecting the cable until the gap is present.

7. The method of claim 6, further comprising securing a mid-support baluster to the beam between the first and second posts.

8. The method of claim 7, further comprising placing a beam cover over the beam.

9. The method of claim 8, further comprising placing post caps on each of the posts.

10. A method of assembling a cable railing system, the method comprising the steps of:
   providing a cable guide assembly secured between a first post and a second post, the cable guide assembly comprising a first cable guide insert, a second cable guide insert, and a cable looping back and forth between the first and second cable guide inserts, wherein a first end of the cable extends through and out of the first post and a second end opposite the first end of the cable extends through and out the second post, and tensioning the cable using at least one tensioner;

wherein the first cable guide insert is inserted into a guide receiving channel of the first post and wherein the second cable guide insert is inserted into a guide receiving channel of the second post, the first and second posts having a cable slot providing clearance for the cable as the cable guide assembly is slidably secured to the first and second posts.

11. The method of claim 10, wherein the tensioner comprises a tensioner base, a compression spring, a tensioner body biased apart from the tensioner base by the compression spring, a carriage slidably engaged to the tensioner body by a threaded adjuster bolt, wherein turning of the threaded bolt moves the carriage relative to the tensioner body and wherein the carriage comprises a cable-receiving channel with a one-way cable clamp.

12. The method of claim 11, wherein tensioning the cable using the at least one tensioner comprises:

feeding at least one of the first or second ends of the cable through a cable-receiving channel of the carriage;

pulling the at least one of the first or second ends of the cable hand-taut through the tensioner;

turning the adjuster bolt on the tensioner body and thereby moving the carriage in a first direction away from the tensioner base and introducing further tension in the cable until the tension in the cable overcomes a force of the compression spring and moves the tensioner body in a second direction towards the tensioner base until the tensioner body abuts the tensioner base.

13. The method of claim 12, wherein tensioning the cable further comprises:

deflecting the cable at some point between the first and second ends, wherein the deflection causes the cable to at least semi-permanently stretch by some amount of first length which allows the compression spring to bias the tensioner body away from the tensioner base by the same amount of first length; and retightening the cable by turning the adjuster bolt on the tensioner body and thereby moving the carriage in a first direction away from the tensioner base and introducing further tension in the cable until the tension in the cable overcomes the force of the compression spring and moves the tensioner body in a second direction towards the tensioner base until the tensioner body abuts the tensioner base.

14. The method of claim 13, wherein the steps of deflecting the cable and retightening the cable is repeated until the compression spring is no longer able to distance the tensioner body from the tensioner base.

15. A method of assembling a cable railing system having a pair of posts, an expandable cable, and a pair of cable braces coupled to the expandable cable, the method comprising the steps of:

positioning the pair of posts on a support surface;

securing the pair of posts to the support surface;

expanding the expandable cable to extend the cable from one post to the other post;

securing the cable braces to the posts; and tensioning the cable using a tensioner and wherein the tensioner comprises:

a tensioner body to be positioned near an adjacent one of the posts;

a movable carriage movably associated with the tensioner body and comprising a cable clamp for gripping the expandable cable;

an actuator operative for moving the movable carriage away from the adjacent post; and a compression spring positioned between the adjacent post and the tensioner body for biasing the tensioner body away from the adjacent post, and wherein the actuator can be operated to urge the movable carriage away from the adjacent post causing the tensioner body to be urged toward the adjacent post in opposition to the biasing of the tensioner body away from the adjacent post by the compression spring.

16. The method of claim 15, wherein the expandable cable comprises a single serpentine cable looped back and forth through the cable braces.

17. The method of claim 15, further comprising the step of positioning a beam between the first and second posts prior to the step of tensioning the cable.

18. The method of claim 17, further comprising the step of placing a beam cover over the beam.

19. The method of claim 15, further comprising the step of placing post caps over the posts after the step of securing the cable braces to the posts.

* * * * *